Jan. 16, 1940.   A. L. WALLACE   2,187,253
CONTINUOUS VULCANIZER
Filed March 16, 1935   6 Sheets-Sheet 1

INVENTOR.
A. L. Wallace
BY Thomas Howe
ATTORNEY.

Jan. 16, 1940.  A. L. WALLACE  2,187,253
CONTINUOUS VULCANIZER
Filed March 16, 1935   6 Sheets-Sheet 2

A. L. Wallace INVENTOR.
BY Thomas Howe
ATTORNEY.

Jan. 16, 1940.  A. L. WALLACE  2,187,253
CONTINUOUS VULCANIZER
Filed March 16, 1935  6 Sheets-Sheet 4

FIG.11

A. L. Wallace  INVENTOR.
BY Thomas Howe
ATTORNEY.

Jan. 16, 1940.  A. L. WALLACE  2,187,253
CONTINUOUS VULCANIZER
Filed March 16, 1935  6 Sheets-Sheet 5

A. L. Wallace  INVENTOR.
BY Thomas Howe
ATTORNEY.

Jan. 16, 1940.  A. L. WALLACE  2,187,253
CONTINUOUS VULCANIZER
Filed March 16, 1935  6 Sheets-Sheet 6

A. L. Wallace INVENTOR.
BY Thomas Howe
ATTORNEY.

Patented Jan. 16, 1940

2,187,253

UNITED STATES PATENT OFFICE 2,187,253

CONTINUOUS VULCANIZER

Archibald L. Wallace, Brooklyn, N. Y., assignor to Richard H. Crook, as trustee

Application March 16, 1935, Serial No. 11,395

11 Claims. (Cl. 18—6)

This invention relates to a vulcanizer for continuously vulcanizing rubber hose, belting and the like.

The main object of the present invention is to provide a mechanism which shall efficiently perform the desired vulcanization and which shall be reliable and economical in the use of power.

A further and more detailed object of the invention is to provide improved means for continuously operating the mould members.

A further object of the invention is to improve the supports or bearing surfaces for the structure including the mould members.

A further object of the invention is to provide improved means for applying pressure to the material to be vulcanized.

A further object of the invention is to provide improved means for supplying the vulcanizing heat.

A further object of the invention is to provide improved means for driving the mould member structure.

A further object of the invention is to provide improved means for guiding and holding the several mould member series in proper relation.

Other and ancillary objects of the invention will appear hereinafter.

In the accompanying drawings, which illustrate the invention.

Referring to the drawings, and first to Figs. 1 to 11 inclusive, the apparatus comprises a frame including the uprights 1 upon which are mounted the means for operating the heated pressure mould members and also the operating means for the steel strips which are employed in the vulcanizing operation as will be hereinafter explained.

Figure 1:
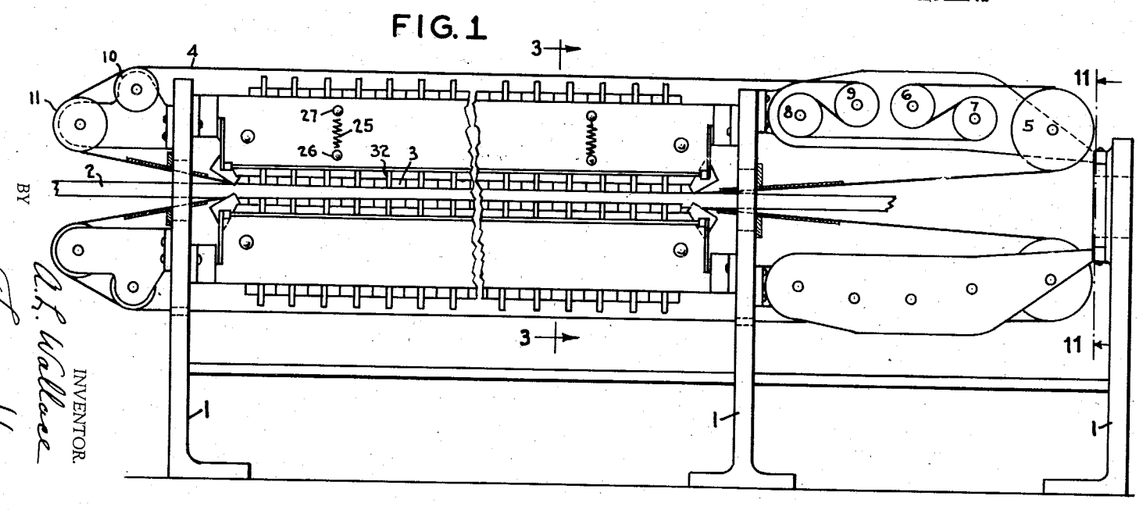
Fig. 1 is a side elevation of a vulcanizing apparatus embodying the invention the different devices for handling the steel strips, except the top and bottom ones, being omitted for the sake of clearness and also the pressure mould members, except two series, being omitted for the sake of clearness.
Figure 2:
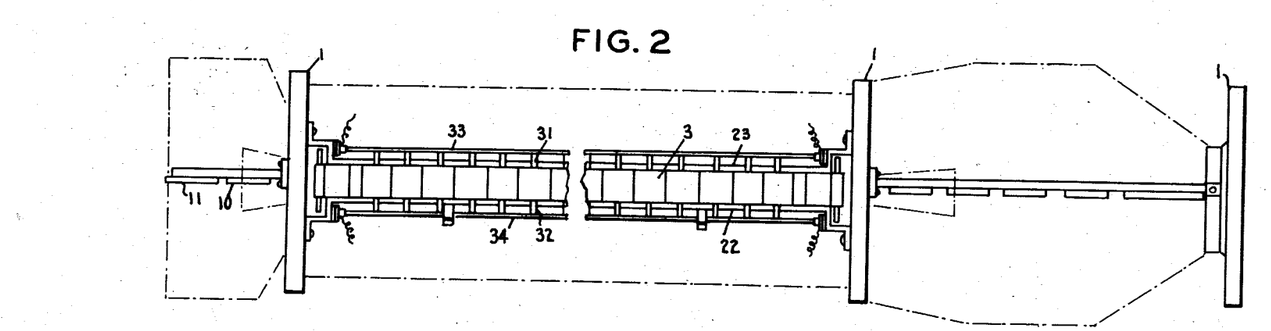
Fig. 2 is a top plan view of the apparatus of Fig. 1.
Figure 3:
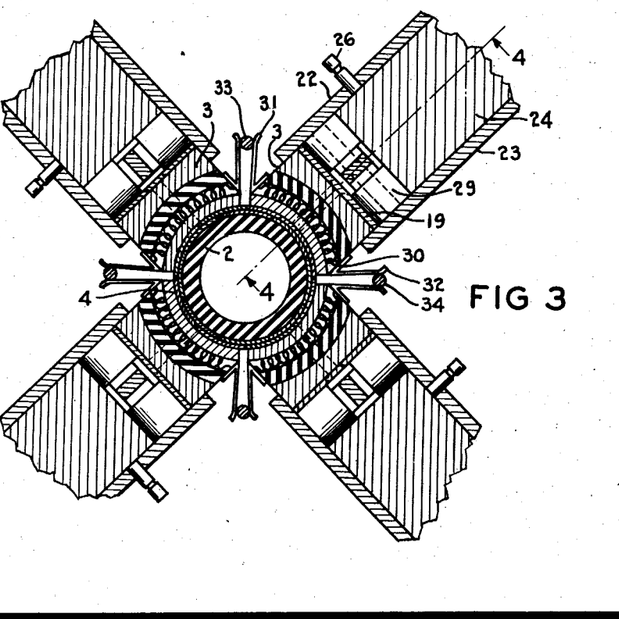
Fig. 3 is a section, on an enlarged scale, partly broken away, on the line 3—3 of Fig. 1.
Figure 4:
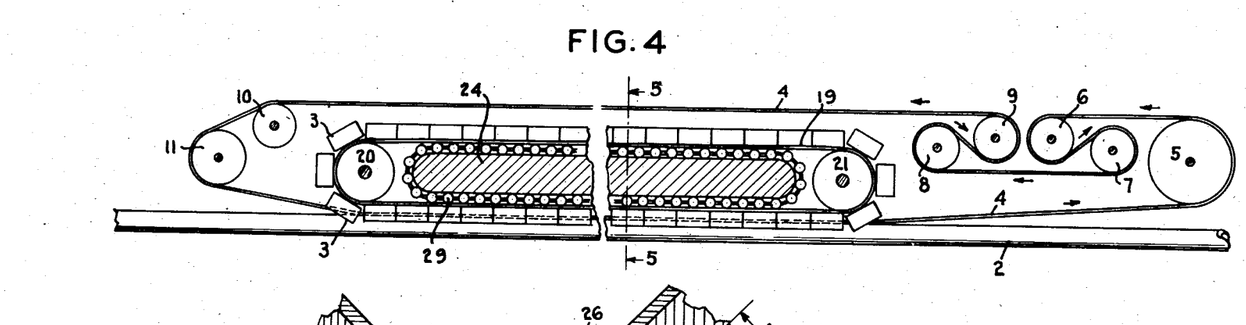
Fig. 4 is a section, on a reduced scale, on the line 4—4 of Fig. 3, showing a single steel strip operating means and a single pressure mould operating means.
Figure 5:
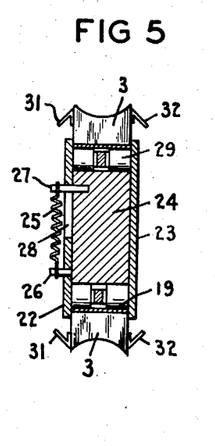
Fig. 5 is a section, on an enlarged scale, on the line 5—5 of Fig. 4, showing a cross section of the pressure mould operating means.
Figures 6, 7, 8, 9, 10:
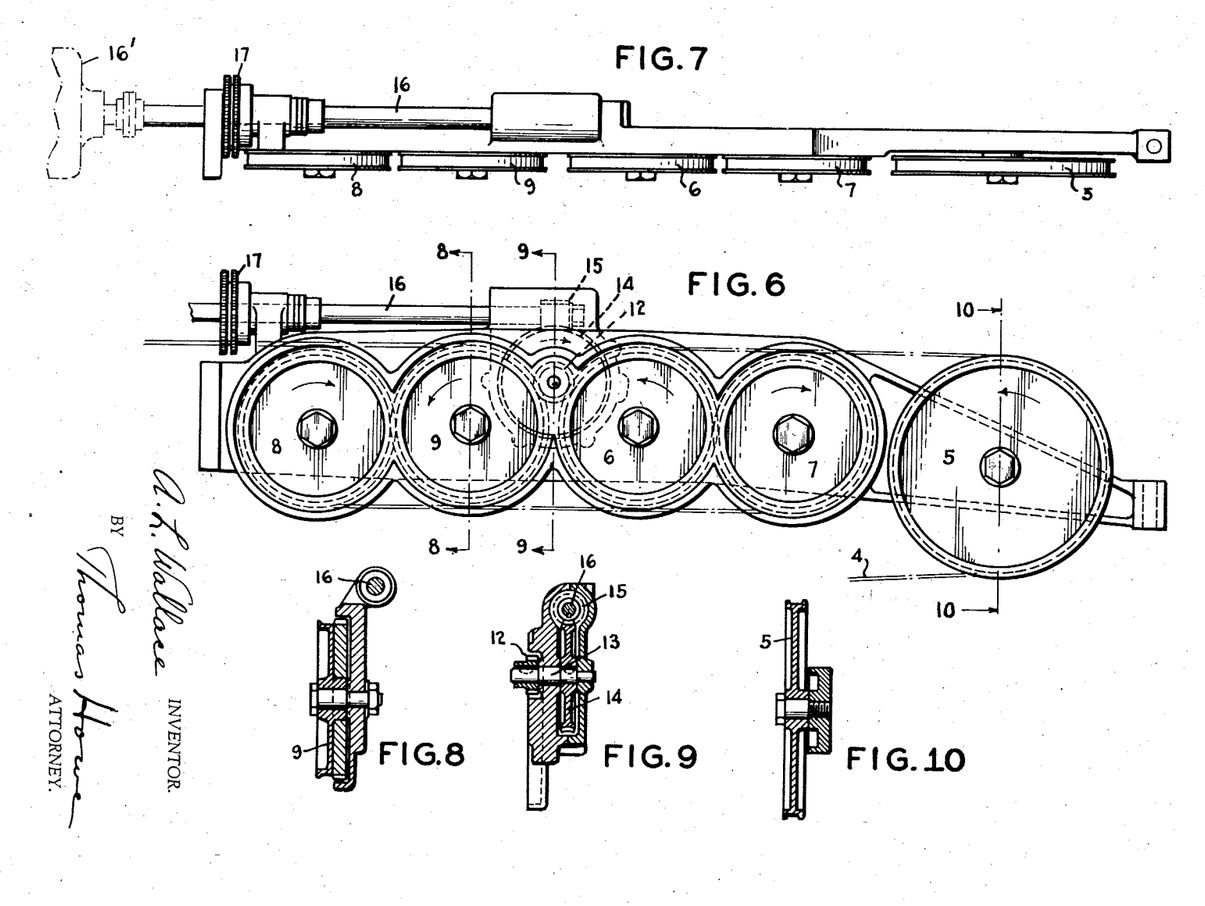
Fig. 6 is a side elevation of the driving means for a steel strip.
Fig. 7 is a top plan view of the apparatus of Fig. 6.
Fig. 8 is a section on the line 8—8 of Fig. 6.
Fig. 9 is a section on the line 9—9 of Fig. 6.
Fig. 10 is a section on the line 10—10 of Fig. 6.

Referring particularly to Figs. 3, 4 and 5, the rubber tube or hose 2 to be vulcanized is passed between the concave faces of heated, spring-pressed moulds 3. Between the faces of these moulds and the rubber tube are interposed thin flexible steel strips 4 which surround the hose in two layers, the layers breaking joints with each other and forming an envelope for the hose against which the mould members exert pressure and supply the necessary heat during the vulcanizing operation. The mould members, as will be shortly explained, move with the rubber hose in its passage and are successively brought into operation as new portions of the hose to be vulcanized are presented, the hose being drawn forward through the vulcanizing apparatus by pulling upon the steel strips which are tightly pressed against and even embedded to some extent within the hose, the steel strips being driven by suitable driving means. The rubber hose to be vulcanized is fed into the apparatus and drawn therethrough continuously, the vulcanizing operation being continued for as long a period as desired.

Each of the steel strips 4 is provided with identical apparatus for driving and guiding it, the apparatus for the different strips being distributed at equal angles about the axis of the apparatus. Inasmuch as the apparatus for each strip is identical a description of such apparatus for one strip will suffice for all.

Figure 11:
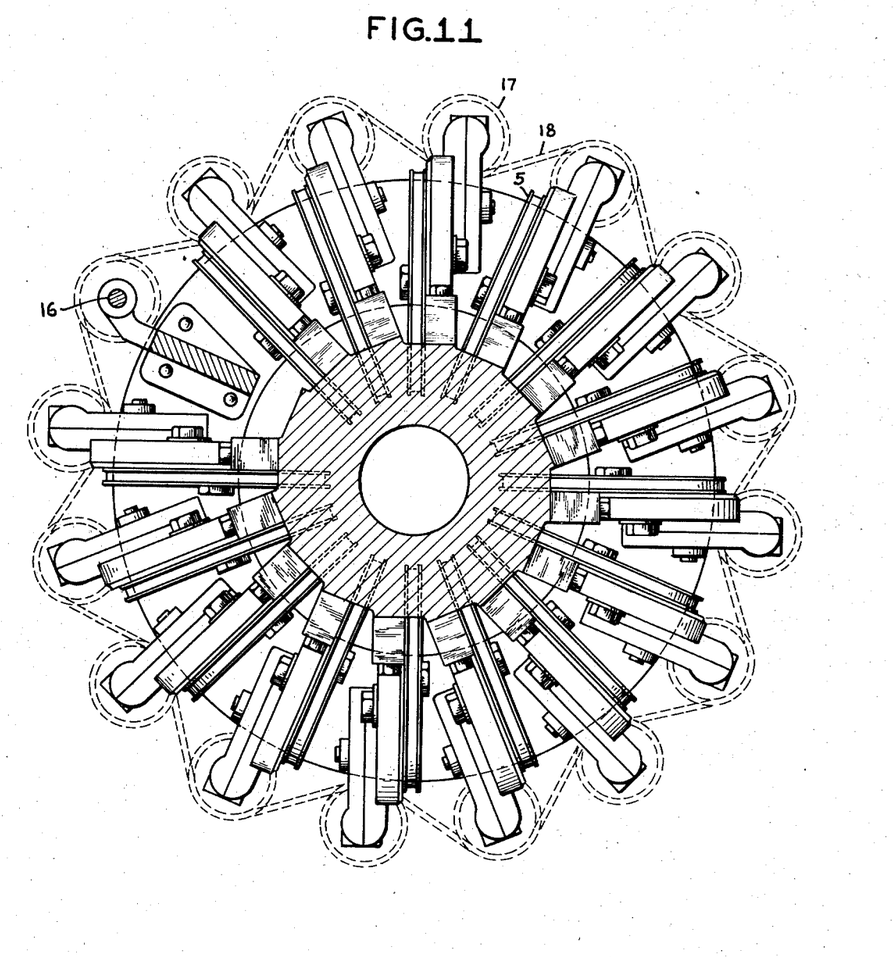
Fig. 11 is a section on the line 11—11 of Fig. 1 with all of the steel strip driving means in place.
Figure 12:
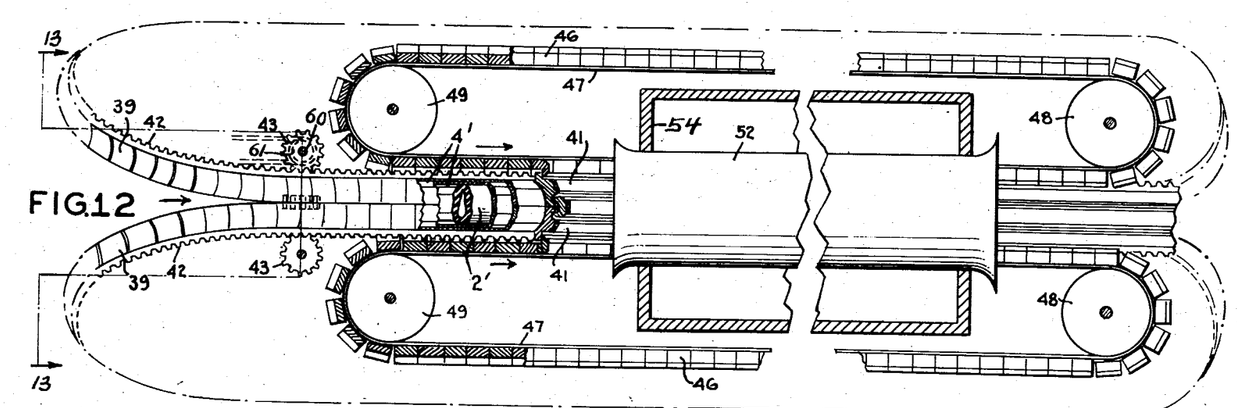
Fig. 12 is an elevation, partly in section on the line 12—12 of Fig. 13 and partly broken away, showing the construction and manner of manipulating the pressure mould members and clamping means therefor in a modified structure of vulcanizing apparatus.
Figure 13:
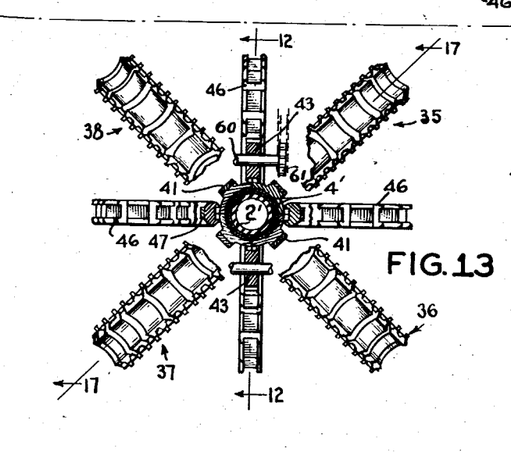
Figure 13 is an end view looking from the left of Fig. 12, broken away to show a section on the line 13—13 of that figure and also a transverse section through the hose and its enclosing parts when they are in the relation for the vulcanizing.
Figure 14:
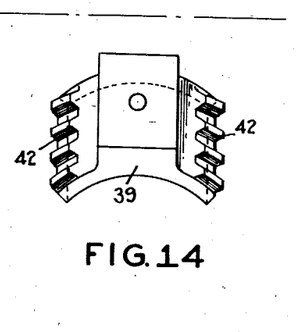
Fig. 14 is a perspective view, on an enlarged scale, of an individual mould member.

Referring particularly to Fig. 4, a steel strip 4, which is endless, enters beneath the pressure moulds 3 at the left and after passing out from the pressure moulds at the right extends to and about the pulley 5 thence it passes about the pulley 6, to and about the pulley 7, to and about the pulley 8, to and about the pulley 9, whence it passes over the guide pulleys 10 and 11 to the point of beginning. The pulley 5 is simply an idle guide pulley but (see Figs. 7 to 10 inclusive) the pulleys 6, 7, 8 and 9 are driven. The pulleys 8 and 9 are geared together, as shown, while the pulleys 6 and 7 are geared together. Meshing with the pulleys 6 and 9 is a spur gear 12 fixed on the shaft 13. Fixed upon the shaft 13 is a worm wheel 14 engaging with the worm 15 fixed on the shaft 16 to which is also fixed the driving sprocket 17. It will thus be seen that the power applied to the driving sprocket 17 is transmitted through the gearings to drive the pulleys 6, 7, 8 and 9. It will further be observed that by reason of the sinuous course of the steel strip about the pulleys it will have a greater area of contact therewith and the pulleys will have a greater grip on the strip. It will now be apparent that as the pulleys are thus driven, the steel strip will be pulled to the right at its bottom course (see Fig. 4) and will return from right to left at its top course. The manner of distribution of the driving apparatus of Figs. 6 to 10, for all of the sixteen steel strips about the mechanism is shown in Fig. 11. The sprockets 17 it will be seen are connected together by an endless sinuous sprocket chain 18 and the driving power is supplied by extending one of the shafts 16 beyond its sprocket and connecting thereto any suitable driving means such as an electric motor 16' and by means of the sprocket chain 18 the drive is transmitted to the operating means for the other strips. The worm drives 14—15 are alternately right and left handed so that all of the strips 4 are pulled in the same direction. The guide pulleys 10 and 11 for each strip are distributed in a similar manner about the entrance end of the apparatus.

The pressure moulds 3 are arranged in four distinct endless series and inasmuch as each one is the same as the others a description of one of them will suffice for all. Referring particularly to Figs. 3 to 5, each series of pressure moulds comprises an endless steel belt 19 upon which are individually secured, by rivets or in other suitable ways, the pressure moulds 3. The belt 19 with its secured pressure moulds 3 thus forms an endless flexible structure which passes about the rotatable supporting pulleys 20 and 21. It will be seen that except where the moulds pass about the pulleys, that is upon straight runs such as the upper and lower courses between the pulleys, the moulds fit closely together. The steel belt 19 and the mould members at their lower course, travel between side plates 22 and 23 which are fixed at their ends to the stationary frame of the apparatus. Adapted to slide up and down between the plates 22 and 23 is a pressure bar 24 which is urged toward the mould members by springs 25 each of which is secured at one end to a pin 26 fixed in one of the side plates 22, and at the other to a pin 27 fixed in the pressure bar 24 and projecting through a slot 28. Between the pressure bar 24 and the mould members 3 at its lower course is interposed an endless series of rollers 29 surrounding the pressure bar 24, these rollers being carried by an endless chain such that the surfaces of the rollers at their lower course may contact on the one hand with the pressure bar and on the other hand with the steel strip carrying the pressure moulds so as to form a roller bearing therebetween.

To suitably heat the pressure mould members so as to properly vulcanize the rubber being treated, an electric heating resistor 30 is inserted in a cavity adjacent the pressure face of the member. Current is supplied to the resistor by contact shoes 31 and 32 carried by the mould member, electrically connected with the ends of the resistor and bearing upon rods 33 and 34 of opposite electric polarity extending along the lower course of the pressure mould members and supported upon the stationary frame of the apparatus. To supply the current to all four of the series of mould members, four of these current supplying bars are provided being distributed about the apparatus as indicated in Fig. 3, the bars being alternately of plus and minus polarity. As each pressure mould member enters its lower course and is about to enter into the vulcanizing operation the shoes 31 and 32 come into contact with the trolley bars as 33 and 34 whereupon circuit through its heating element is made and this circuit is maintained during the vulcanizing operation along the lower course of travel of the main members by the sliding of the contact shoes along the trolley bars until the vulcanizing operation has been finished and the contact shoes pass off the trolley bars.

It will now be seen that (see particularly Fig. 3) in the use of the apparatus, the inner courses of the four series of endless pressure mould members will form a substantially complete circumferential enclosure about the rubber hose 2, there being interposed between these members and the rubber hose, the two layers of flat flexible steel strips 4. The spring pressed bars 24 will force the concave faces of the mould members against the steel strips which will thereby exert a pressure upon or even become embedded in the rubber of the hose. At the same time the heat supplied by the electric heater in each of the mould members will cause the vulcanizing of the material. The hose will thus be subjected to the proper heat and pressure to cause it to assume the desired condition of vulcanization. A pull to the right (Fig. 4) upon each of the steel strips 4 is exerted by the pulleys 6, 7, 8 and 9 as beforedescribed and as these strips move to the right under such pull they will draw, by reason of their frictional or embedded engagement with the rubber hose, the hose with them and also the mould blocks. The rollers 29 provide a roller bearing support for the mould blocks and their supporting steel strip, thereby greatly reducing the wear and tear on the apparatus and the power necessary to draw the strips, rubber hose and mould blocks through the apparatus. While the lower course of each of the steel strips 4 is drawn to the right (see Fig. 4) the upper course of the strip will be returning to the left and so the strip may be moved continuously so long as it is desired to continue the vulcanizing operation. As the lower course of mould members moves to the right with the steel strips, at the end of that course, the blocks move upwardly about the pulley 21 and then to the left along the upper course and downwardly about the pulley 20 to re-enter the lower course and successively take their places in the vulcanizing operation. Similarly the lower course of the endless chain of rollers 29 will be rolled between the pressure bar 24 and the belt 19 so that the lower course of the series of rollers as a whole will move toward the right, eventually turning upwardly about the right hand side of the pressure bar and returning along the top of that bar to the point where they turn downwardly about the bar and re-enter the space between the mould belt and the bar.

The tension on the steel strips might be relieved by also applying power to the shaft of either or both of the pulleys 20 and 21. By the operations as described it will be seen that the uncured rubber hose enters in between (at the left of Fig. 4) the steel strips 4 which are pressed upon by the heated mould members so that the hose is firmly gripped thereby and is carried along with the strips and members, meanwhile being subjected to the heat and pressure to give proper vulcanization and is discharged from the strips and mould members in proper vulcanized condition (at right of Fig. 4) and this may be carried on continuously as long as desired.

In the modification shown in Figs. 12 to 18 inclusive, there are four endless belts or series 35, 36, 37 and 38 of mould members, each of the mould members 39 having a curved concaved face co-operating with the similar members of the other series to form a tubular encasement during the vulcanizing, for the rubber hose $2^1$ to be vulcanized. At the back of each of the members, opposite the curved face, just referred to, the mould members of each series are secured to an endless flexible metal belt 41 by means of riveting, or in other suitable ways, the moulds fitting close together on straight portions of the belt but separating to permit the ready passage of the belt about pulleys or other curves. Also the moulds of one series preferably break joints with the moulds of adjacent series. Also at the back of each of the mould members, adjacent the marginal edges thereof, are raised gear teeth 42 forming racks, the racks on the mould members of one series co-operating with each other to form continuous racks at the edges of the mould members throughout straight portions of the series and adapted to be continuously driven by two of the gears 43. The adjacent rack teeth of adjacent edges of two series of mould members register with each other so as to form practically one rack which is engaged by one driving gear 43, such driving gear engaging simultaneously with the teeth on the two series.

Figure 16:
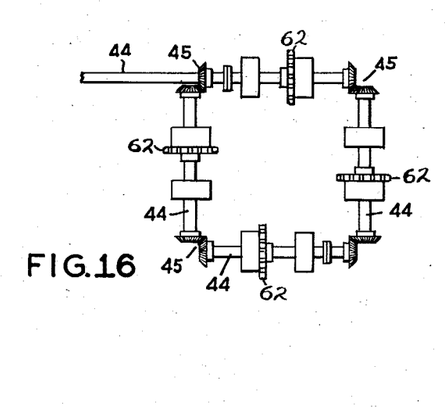
Fig. 16 is an elevational view showing the arrangement of the driving means for the driving gears for the mould members.
Figure 17:
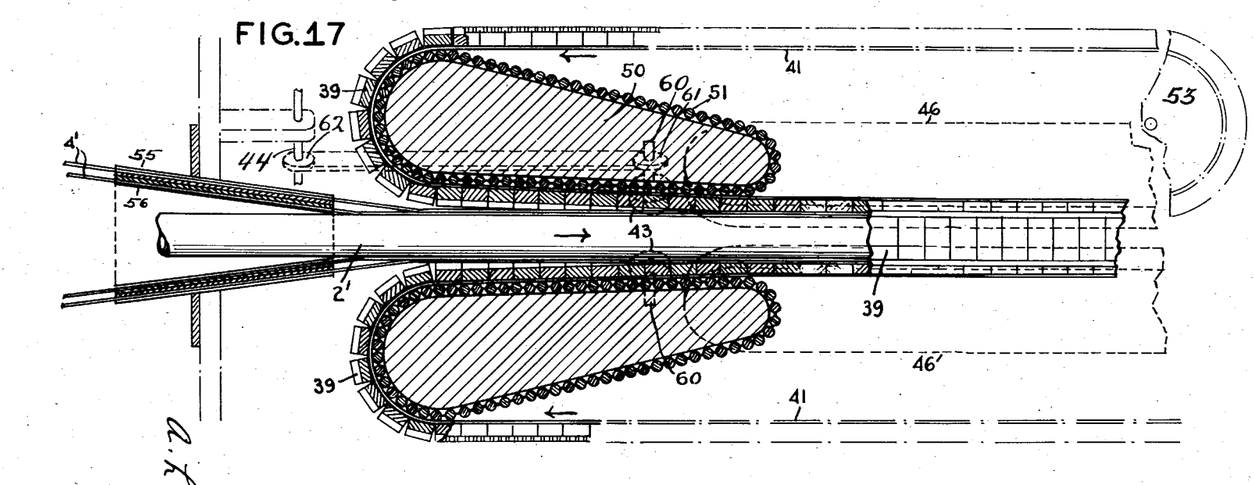
Fig. 17 is an elevation, partly in section on the line 17—17 of Fig. 13 and partly broken away, showing particularly the manner of operating the mould members.
Figure 18:
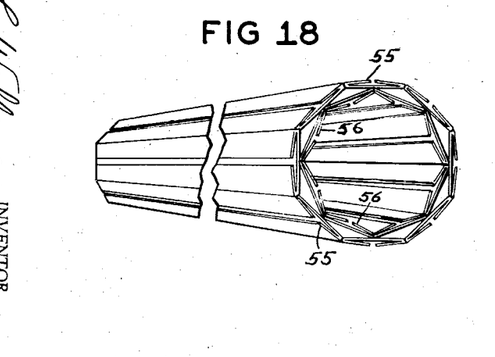
Fig. 18 is a perspective view, partly broken away, of the guiding means for the steel strips at their entrance into the vulcanizer.

The gears 43 are each fixed on a rotatable shaft 60 to which is fixed a sprocket wheel 61, the four sprocket wheels 61 being driven by sprocket chains passing about them and the sprocket wheels 62 on shafts 44 which are rotatably mounted in bearings on a stationary support, these shafts being connected in driving relation by pairs of bevel gears 45 and one of the shafts 44 is extended and may thereby be driven by any suitable driving means such as a motor or the like. The bevel gears 45 are all of the same size so that the sprockets 62 which are of the same size are driven at the same speed, the equal sized sprockets 61 being driven at the same speed and the equal gears 43 are driven at the same speed and turn in a direction to all drive their engaged mould series in the same direction.

Each of the series of mould members 39 at the entrance end of the apparatus passes about a stationary support 50, there being interposed between the steel belt 41 and the support 50 an endless chain of rollers 51 which forms a roller bearing therebetween whereby the ease of passage of the mould series about the support is facilitated. At the other end the series of mould members passes about a supporting pulley 53. The supports 50 are inclined inwardly toward the hose treated, passing from the entrance toward the vulcanizer, whereby the moulds of the several series are gradually passed closer together as they move toward the vulcanizer, thereby pressing upon the flexible steel strips $4^1$, similar to the strips 4, which exert the desired vulcanizing pressure upon the rubber hose $2^1$.

Figure 15:
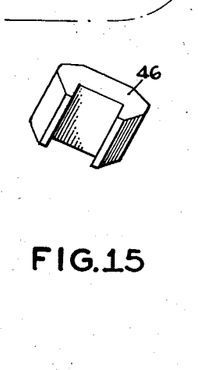
Fig. 15 is a perspective view, on an enlarged scale, of an individual dog or clamping member for securing the mould members of different series together.

To secure the mould members of the several series together after they have been forced to their innermost position and have passed beneath the gears 43, there are provided a plurality of series, in this case four, of clamps or dogs each of which comprises a series of U-shaped dogs or clamps 46 formed into an endless belt or series by being secured at their backs by rivets, or in any other suitable way, to an endless flexible steel belt or strip 47 passing over the pulley 48 at one end and about the pulley 49 at its other end.

The lower course of the endless series 46 of clamps passes adjacent and parallel to the series of mold members and during the vulcanizing operation bridges over two racks at the edges of adjacent mould members and the sides of the grooves in the clamp members fit tightly against the inner sides of the racks so that the mould members of the different series are securely held together during the vulcanizing operation. Such operation having been completed, the series of clamps in passing about the pulley 48 will be moved out of engagement with the series of mould members thus permitting the latter to separate and return to their point of entry into the machine (left in Figs. 12 and 17). The clamps will return across the upper course of their endless series and turn downwardly about the pulley 49 and as they enter the lower course of the series will be successively brought into engagement with the mould members to hold them together as before referred to.

The flexible steel strips $4^1$ are guided into proper relative positions about the hose to be vulcanized by means of the tapered structure (see Figs. 17 and 18) comprising the outer circumferential series of conduits or channels 55 and an inner series of similar conduits or channels 56 secured in position by welding, soldering or in any other suitable way. Each of the channels is formed from a sheet of metal having its edges bent toward each other as shown and the channels of the inner and outer series break joints. One of the strips $4^1$ is passed through each of the channels and is thereby guided into its proper position with relation to the other strips and the hose.

It will now appear that the uncured hose $2^1$ will be fed in between the steel strips $4^1$ at the left (Fig. 17) of the apparatus and will then pass beneath the mould members, that the mould members driven by the gears 43 will be forced down with a desired pressure upon the strips $4^1$ and the uncured hose (by the inclined supports 50) so that the hose and strips will be carried along with the moulds as the series of mould members is moved to the right and the hose will be placed under the desired vulcanizing pressure; that shortly before the mould members are pressed to their innermost positions, they will pass under the driving gears 43 and thereafter, when the mould members are at their innermost positions they will be clamped together by the dogs 46 and so held securely together, while they pass through the vulcanizer which may be a metal tube 52 suitably heated by being included in a steam chamber 54 or in other suitable ways; that after the vulcanizing operation has been completed the clamps 46 will separate from the mould members which are permitted to separate and, being arranged in an endless series, they will successively return to the entrance to the apparatus and again pass through the vulcanizing operation with the rubber hose. Also the clamps or dogs for securing the mould members together, being arranged in an endless series, will, after disengaging from the mould members after the vulcanizing operation, return to the left and be successively brought into operation in connection with the mould members. The clamps will ordinarily be carried along with the series of mould members by reason of their frictional engagement therewith but their movement may also be facilitated by applying power to the shaft of the pulley 48 if desired. On account of the endless character of the steel strips, the series of securing dogs and the series of mould members the operation of vulcanizing may be carried on continuously for as long a period as desired, the uncured rubber hose being fed into the entrance end of the apparatus (left of Fig. 17) and the vulcanized hose is discharged from the exit end of the apparatus (right of Fig. 12).

It will be observed that the driving gears 43 push upon the series of mould members in the vulcanizing course and thereby push such mould members together and close up any spaces between them which might otherwise be formed.

While the invention has been illustrated in what are considered its best applications, it may be embodied in other structures without departing from its spirit and is not therefore limited to the structures shown in the drawings.

What I claim is:

1. A vulcanizing machine comprising in combination a plurality of parallel endless series of mould members adapted to receive the material to be vulcanized between them and means for exerting pressure upon mould members of one or more of said series during the vulcanizing operation, tending to force them toward the said material strips within said mold members and driving means for said strips connected in driving relation thereto independently of said mold members.

2. A vulcanizing machine comprising in combination a plurality of parallel endless series of mould members adapted to receive the material to be vulcanized between them and a spring pressed bar for exerting yielding pressure upon mould members of one or more of said series during the vulcanizing operation, tending to force them toward the said material strips within said mold members and driving means for said strips connected in driving relation thereto independently of said mold members.

3. A vulcanizing machine comprising in combination a plurality of parallel endless series of mould members adapted to receive the material to be vulcanized between them and means for exerting pressure upon mould members of one or more of said series during the vulcanizing operation, tending to force them toward the said material, said endless series comprising an endless belt and a plurality of mould members secured thereto, a multiplicity of strips within said mould members, means to support said strips in convergent relation closely spaced in numerous radial planes intersecting lengthwise the major axis of a cylindrical article to be vulcanized and driving means for said strips connected in driving relation thereto independently of said mould members.

4. A vulcanizing machine comprising in combination an elongated relatively narrow vulcanizing chamber, a multiplicity of parallel endless series of mould members adapted to receive the material to be vulcanized between them and means for exerting pressure upon mould members of each of said series during the vulcanizing operation, tending to force them toward the said material, said endless series comprising an endless belt for each of said series with mould members secured thereto collectively defining and completely enclosing a restricted cylindrical vulcanizing space within said chamber, and rollers interposed between said belt and said pressure exerting means, said rollers including a series for each of said mould series, each series of rollers operating in an orbital path confined by the orbital path of one of said mould series.

5. A vulcanizing machine comprising in combination a plurality of parallel endless series of mould members adapted to receive the material to be vulcanized between them and means for exerting pressure upon mould members of one or more of said series during the vulcanizing operation, tending to force them toward the said material, a plurality of strips upon the interior of said mould members and adapted to be interposed between the mould members and the material to be vulcanized, and means for driving said strips connected in driving relation thereto independently of said mold members.

6. A vulcanizing machine comprising in combination a plurality of parallel endless series of mould members adapted to receive the material to be vulcanized between them and means for exerting pressure upon mould members of one or more of said series during the vulcanizing operation, tending to force them toward the said material, said endless series comprising an endless belt and a plurality of mould members secured thereto, a plurality of strips upon the interior of said mould members and adapted to be interposed between the mould members and the material to be vulcanized, and means for driving said strips connected in driving relation thereto independently of said mold members.

7. A vulcanizing machine comprising in combination a plurality of parallel endless series of mould members adapted to receive the material to be vulcanized between them and means for exerting pressure upon mould members of one or more of said series during the vulcanizing operation, tending to force them toward the said material, said endless series comprising an endless belt and a plurality of mould members secured thereto and rollers interposed between said belt and said pressure exerting means, a plurality of strips upon the interior of said mould members and adapted to be interposed between the mould members and the material to be vulcanized, and means for driving said strips connected in driving relation thereto independently of said mold members.

8. A vulcanizing machine comprising in combination a plurality of parallel endless series of mould members adapted to receive the material to be vulcanized between them and means for exerting pressure upon mould members of one or more of said series during the vulcanizing operation, tending to force them toward the said material, said endless series comprising an endless belt and a plurality of mould members secured thereto and an endless series of rollers interposed between said belt and said pressure exerting means, a plurality of strips upon the interior of said mould members and adapted to be interposed between the mould members and the material to be vulcanized, and means for driving said strips.

9. A vulcanizing machine comprising in combination a series of mould members adapted to exert pressure upon the material to be vulcanized and heaters mounted on said mould members individually, strips within said mold members and driving means for said strips connected in driving relation thereto independently of said mold members.

10. A vulcanizing machine comprising in combination a series of mould members adapted to exert pressure upon the material to be vulcanized and electric heaters mounted on said mould members individually, strips within said mold members and driving means for said strips connected in driving relation thereto independently of said mold members.

11. A vulcanizing machine comprising in combination a series of mould members adapted to exert pressure upon the material to be vulcanized and electric heaters mounted on said mould members individually, and trolley conductors extending along the path of said mould members and contacts mounted on said mould members and adapted to be in sliding engagement with said trolley conductors, strips within said mold members and driving means for said strips connected in driving relation thereto independently of said mold members.

ARCHIBALD L. WALLACE.